Oct. 13, 1925.

H. O. SCRANTON

CANE STRIPPING MACHINE

Filed Dec. 1, 1924

FIG_2_

FIG_3_

Inventor
Henry O. Scranton
by Herbert W. Dennel
Attorney.

FIG_4_

FIG_5_

Oct. 13, 1925.

H. O. SCRANTON 1,557,113

CANE STRIPPING MACHINE

Filed Dec. 1, 1924 6 Sheets-Sheet 4

Inventor
Henry O. Scranton
by Herbert W. Jenner,
Attorney.

FIG_8_

FIG_9_

FIG_10_

FIG_11_

FIG_12_

Patented Oct. 13, 1925.

1,557,113

UNITED STATES PATENT OFFICE.

HENRY O. SCRANTON, OF JEANERETTE, LOUISIANA.

CANE-STRIPPING MACHINE.

Application filed December 1, 1924. Serial No. 753,188.

*To all whom it may concern:*

Be it known that I, HENRY O. SCRANTON, a citizen of the United States, residing at Jeanerette, in the parish of Iberia and State of Louisiana, have invented certain new and useful Improvements in Cane-Stripping Machines, of which the following is a specification.

This invention relates to machines for stripping the leaves from sugar canes after the tops have been cut off, and is an improvement upon the machine described in Patent No. 1,491,070, which was issued to me on April 22, 1924. The present invention consists chiefly in increasing the number of stripping blades so that they are more efficient, and in providing an automatic feed mechanism for supplying the topped canes to the stripping blades, and in freeing the stripping mechanism of stripped leaves by means of an air blast, all as hereinafter fully described and claimed.

In the drawings, Fig. 7 is a front end view.

Two similar stripping mechanisms or machines formed right and left are provided, and are mounted on a cane harvesting machine as described in the aforesaid patent. As both stripping mechanisms are alike the following description is confined to one of them. The canes 37 are topped by rotary circular cutters 17 and 18 as described in the said patent, and they then slide down a guide track to a carriage in front of the stripping blades. The canes are fed automatically to the stripping blades by feeding mechanism as hereinafter described. The stripping blades are mounted in a housing 20, and a spare set of them, as shown, is provided to which canes may be fed by hand in an emergency. The housing has four guides 21 for the blades instead of two as described in the said patent. These guides are arranged radially in the form of a cross. Blocks 22 are slidable in the guides, and have springs 23 which press each pair of blocks towards each other. The stripping blades 24 are curved in cross-section similar to those of the said patent, but they are not so wide. They are pivoted to the slidable blocks by pins 26, and have cutting edges 27 at their front ends.

Figure 1:
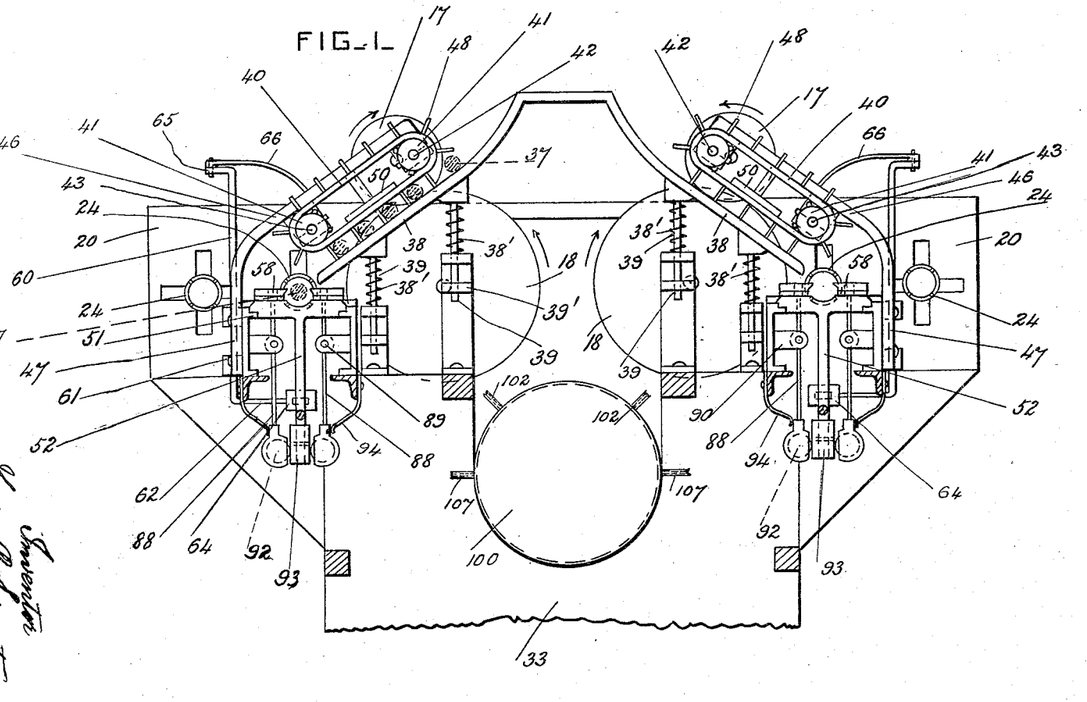
Figure 1 is an end view of two feeding and stripping mechanisms looking towards the rear of the harvesting machine on which they are mounted.
Figure 2:
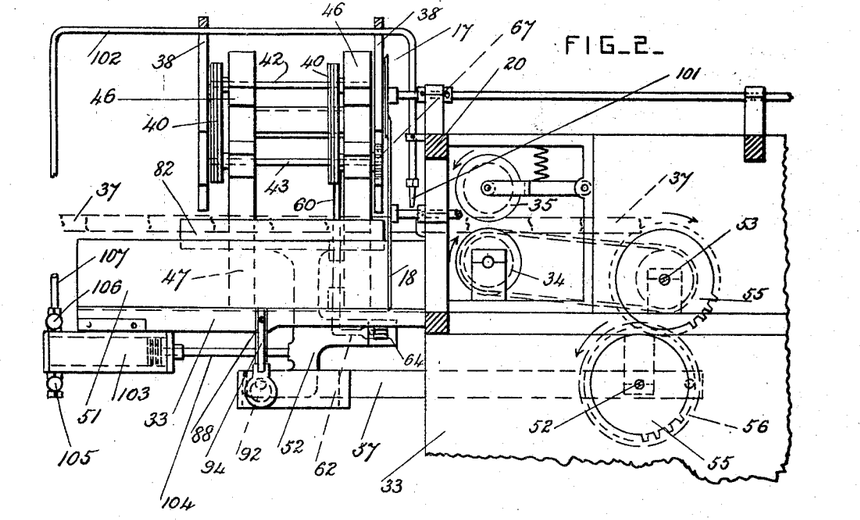
Fig. 2 is a side view of one feeding and stripping mechanism.
Figure 3:
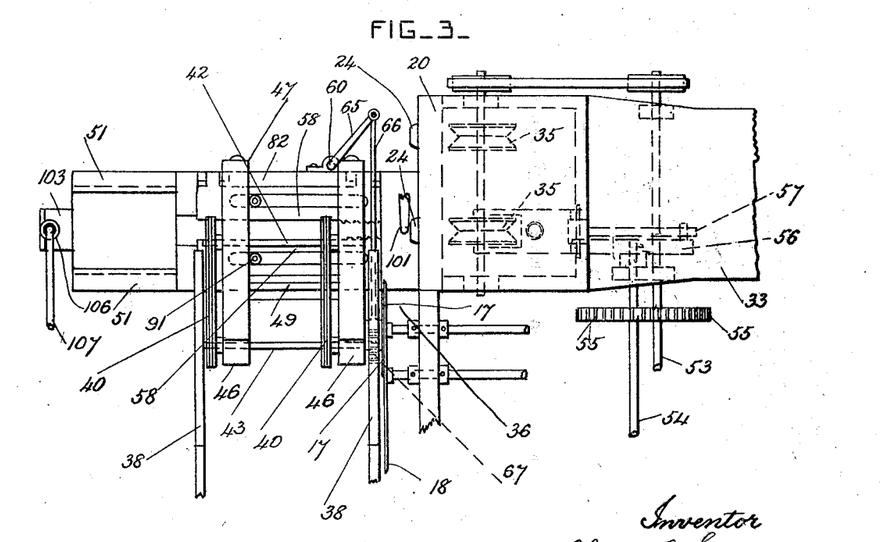
Fig. 3 is a plan view of the same.
Figure 4:
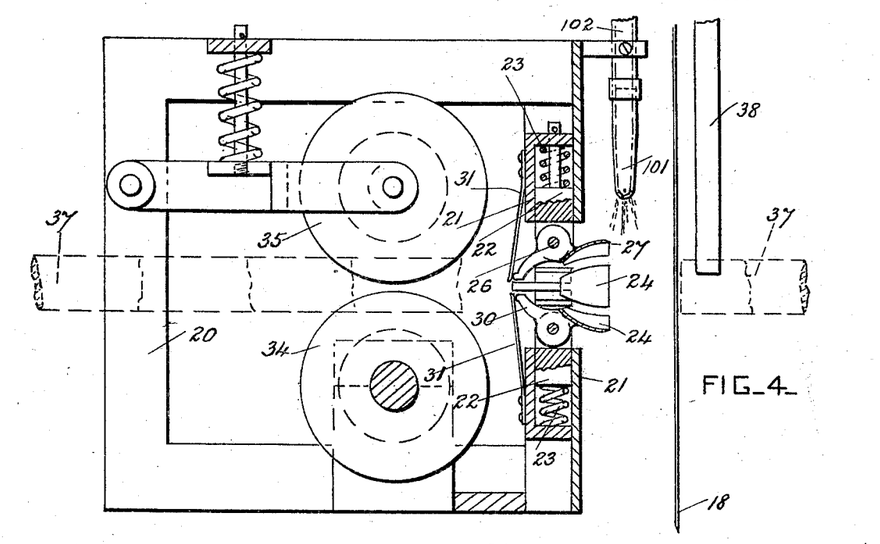
Fig. 4 is a detail side view of one set of stripping blades and its grooved rollers, partially in section and drawn to a larger scale.
Figure 5:
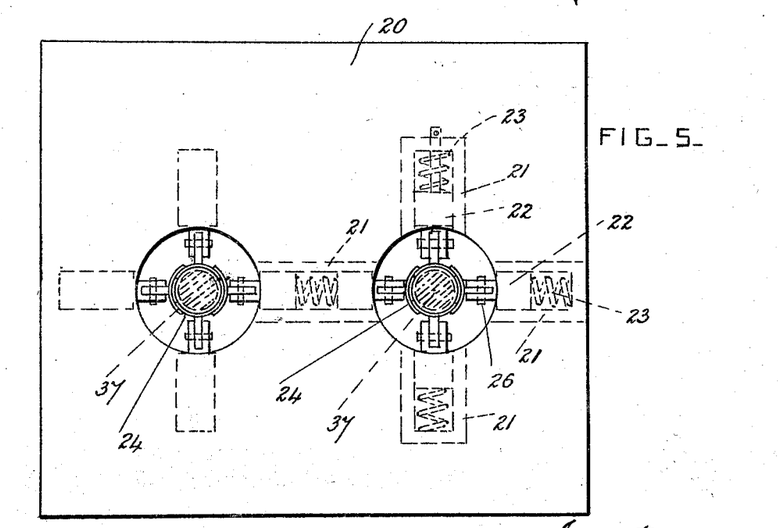
Fig. 5 is a front end view of the stripping blades, showing them closed.
Figure 6:
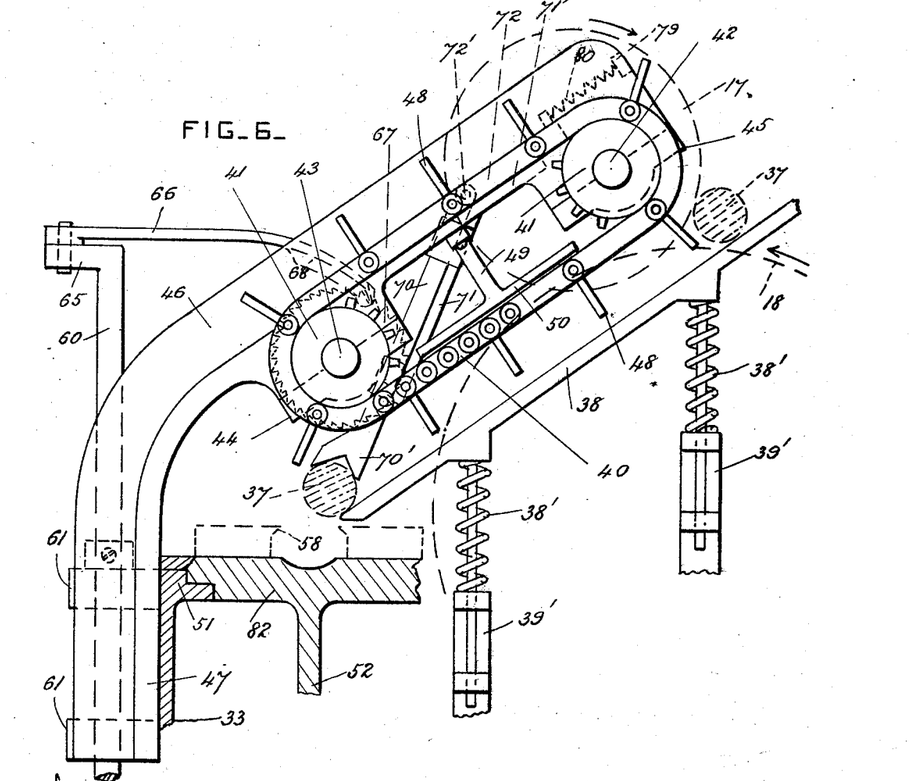
Fig. 6 is a detail front side view of one feeding mechanism.
Figure 7:
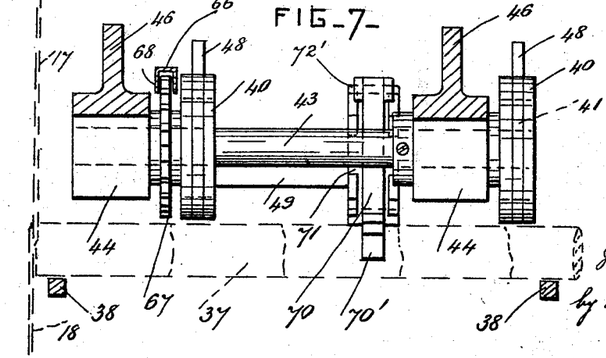
Figure 8:
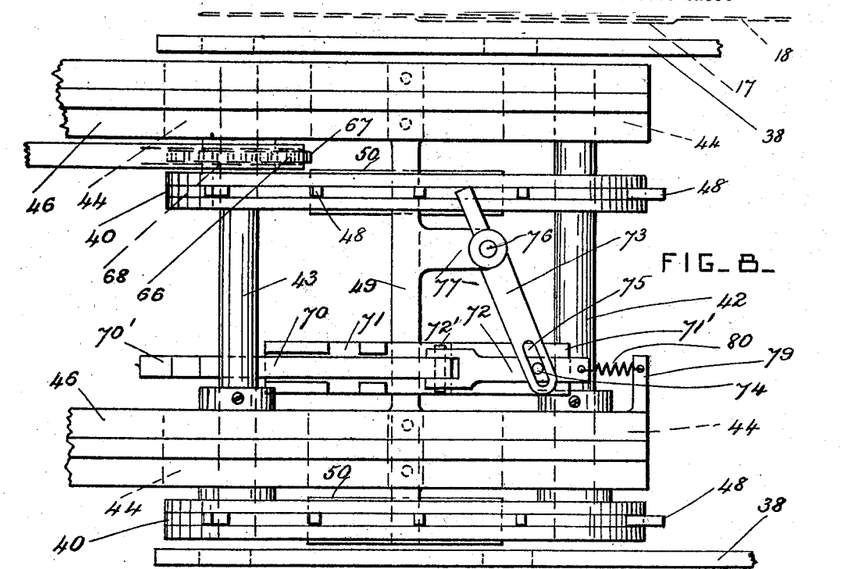
Fig. 8 is a plan view of the same.
Figure 9:
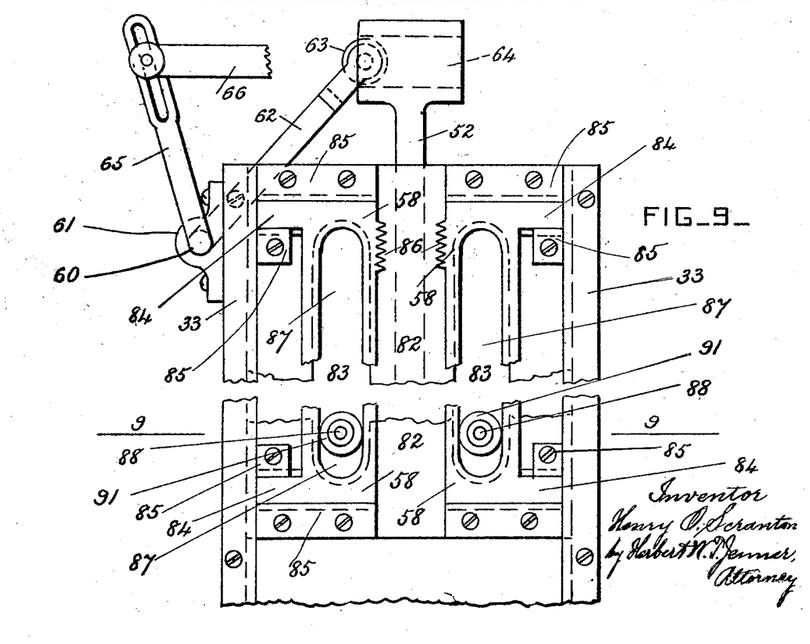
Fig. 9 is a plan view of the sliding carriage.
Figure 10:
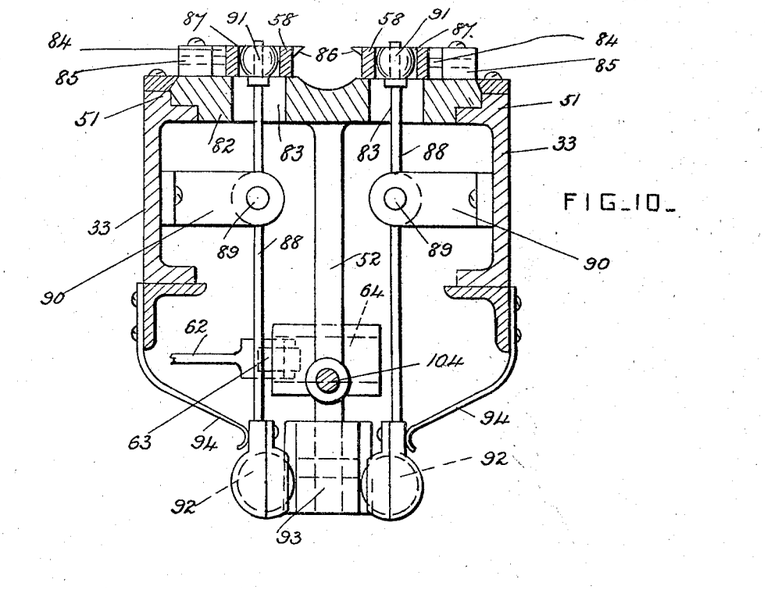
Fig. 10 is a cross-section through the carriage, taken on the line 9—9 in Fig. 9.
Figure 11:
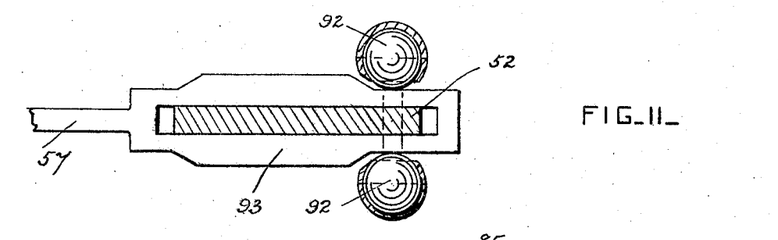
Fig. 11 is a plan view of the end portion of the connecting-rod that slides the carriage, showing the graduated plate and the antifriction balls that operate the clamping dogs.
Figure 12:
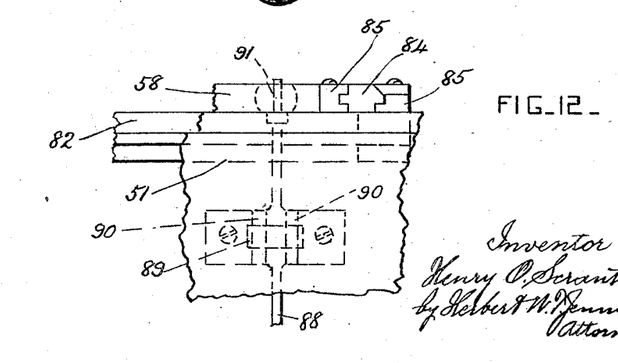
Fig. 12 is a side view of a portion of the platen and one spring arm showing also one of the guides for the dogs.

The rear parts of the blades have lugs 30, and these lugs are engaged by springs 31 which hold the blades apart, as shown by full lines in Fig. 4, to form a converging passage for receiving a cane. The cane presses the lugs 30 apart, and moves the cutting edges into engagement with it, so that the leaves are stripped from it as it is dragged between the blades by the grooved rollers 34 and 35 as described in the said patent. By having four stripping blades instead of two, the leaves can be stripped off the canes more effectively, and a converging passage with a larger entrance for them is provided, as the entrance is expanded or increased horizontally as well as vertically when four stripping blades are provided.

Openings 36 are provided in the framing of the machine for the topped heads of the canes to fall through as they are cut off by the cutters 17 and 18. The upper end portions of the canes 37 drop onto a guide track, formed of inclined guide bars 38, after the tops are cut off. These guide bars are arranged crosswise of the harvesting machine, and they are inclined downwardly towards its side so that they form a track for the canes to slide down. Each guide bar 38 is supported by springs 38' which encircle rods 39 secured to the guide bar and slidable vertically in sockets 39' on the machine frame 33. The guide bars 38 are depressed a little by the weight of the canes, and the springs prevent large canes from becoming jammed in the feeding mechanism.

The feeding mechanism is provided with an endless conveyer preferably formed of two endless chains 40 arranged parallel to each other and supported by sprocket wheels 41. These sprocket wheels are mounted on shafts 42 and 43, journaled in bearings 44 and 45 which are formed upon arms 46. The chains and arms are inclined to correspond with the inclination of the guide track, and they are arranged above the guide track. The arms 46 have vertical standards or extensions 47 at their lower ends which are secured to the frame 33 or any stationary part of the machine out of the path of the canes on the track. These arms support the conveyer so that the canes can be slid down the inclined track by it.

The chains are provided with lugs 48 suitably spaced apart so as to engage with the canes 37 one by one. A crossbar 49 is secured between the middle parts of the two arms, and extends between the upper and lower stretches of the rear chain, and is provided with back rests 50 arranged above the lower stretches of the two chains to keep them in engagement with the canes.

The frame 33 is provided with longitudinal guides 51, and 52 is a carriage for the canes which is slidable on these guides. The carriage is arranged at the lower and delivery end of the conveyer in line with the axis of the curved stripping blades, and is adapted to receive the canes one by one from the conveyer and thrust their upper ends between the stripping blades.

A driving shaft 53 is provided, and it, the grooved rollers 34, and the rotary shears are all revolved in any approved way, and in the directions of the curved arrows adjacent to them on the drawings. A crank shaft 54 is journaled in the frame to the rear of and below the stripping mechanism, and is driven from the driving shaft 53 by toothed wheels 55. The crank shaft has similar cranks 56 on its end portions, each of which reciprocates the carriage 52 to which it pertains by means of a connecting-rod 57. The carriage is provided with toothed dogs 58 for clamping the canes, as will be more fully described hereinafter.

The conveyer is moved step by step, so that one cane is delivered to the carriage each time the carriage is moved forwardly, and the conveyer is preferably operated from the carriage. A vertical shaft 60 is mounted to rock in bearings 61 on the frame 33, and it has an arm 62 secured on its lower end and provided with a roller 63 at its free end which engages with a pocket 64 in the carriage. An arm 65 is secured to the top of the shaft 60, and 66 is a pawl which is pivoted to the arm 65. A ratchet-toothed wheel 67 is secured on the lower shaft of the conveyer, and the pawl engages with the teeth of the ratchet wheel so that the conveyer is operated step by step to correspond with the strokes of the carriage. The pawl 66 is provided with flanges 68 to prevent it from slipping laterally off the ratchet wheel. Each cane is pushed into positive engagement with the toothed dogs 58 of the carriage by means of a pusher bar 70. This pusher bar is arranged diagonally of and between the two chains of the conveyer, and it slides longitudinally in a guideway 71 on the crossbar 49. The lower end of the pusher bar has a fork 70' for engaging with the canes, and its upper end is operatively connected with one end portion of a lever 73 by a short bar 72. The bar 72 slides on a plate 71' at the upper part of the guideway 71, and is pivoted to the pusher bar by a pin 72'. The short bar 72 has a pin 74 at its upper part which engages with a slot 75 at one end of the lever 73. The lever 73 is pivoted at its middle part by a pin 76 to a lug 77 on the crossbar 49, and its other end 78 is arranged in the path of the lugs 48 on one of the chains. The upper end portion of the short bar 72 is connected to a lug 79 on one of the shaft bearings of the conveyer by means of a spring 80, so that the pusher bar is normally held in a retracted position and the lever 73 is moved pivotally in one direction. Each time the conveyer is operated to discharge a cane, the pusher bar is thrust longitudinally downward so that it pushes a cane forcibly into a position to be grasped by the dogs of the carriage, and holds it in that position until the said dogs have grasped it and have clamped it to the carriage.

The carriage has a platen 82 at its top provided with two longitudinal slots 83, and the toothed dogs 58 are slidable laterally on the platen 82, and have lugs 84 which slide in guides 85 arranged crosswise of the platen. The dogs 58 have teeth 86 on their rear end portions which grip the cane and clamp it to the carriage. The dogs have longitudinal slots 87 above the slots in the platen. The dogs are moved laterally towards and away from the cane between them by means of two spring arms 88 pivoted by pins 89 to brackets 90 which project from the guides 51. The upper ends of the spring arms project through the slots in the platen, and have rollers or balls 91 mounted on them, and which work in the slots 87 in the dogs. The lower end portions of the spring arms are provided with antifriction balls or rollers 92 which engage with the sides of a cam plate 93 formed on or secured to the connecting-rod 57. The plate 93 is graduated in width or thickness and it is tapered so that it operates like a face cam and thrusts the lower ends of the spring arms apart after the carriage has commenced its rearward movement, and a cane has been pressed down in the space between the dogs. The plate 93 permits the lower ends of the spring arms to move towards each other before the carriage completes its rearward movement. Springs 94 are secured to the frame and bear on the ball sockets on the lower end portions of the spring arms.

These springs press the balls 92 on the cam plate 93, and move the dogs apart when the plate permits them to do so. The dogs grip the cane when pressed against it, and push it rearwardly between the stripping blades and into engagement with the grooved rollers behind them. The carriage commences its forward movement after the grooved rollers have gripped the cane. The grooved rollers are revolved at a speed sufficient to drag the entire cane clear of the stripping blades before the carriage comes back with another cane.

A tank 100 for compressed air is secured to the frame, and 101 is a blast nozzle connected to the tank by a pipe 102. The nozzle is arranged to deliver a blast of air on the leaves as they are stripped from the canes, and on the stripping blades, so that all trash is blown away and disposed of, and is prevented from clogging the blades. The compressed air is supplied to the tank by any approved air pump. An air pump cylinder 103 is preferably secured to the frame in line with the carriage, and is provided with a piston and a piston-rod 104 which is secured to the carriage. This cylinder has an inlet valve 105, and an outlet valve 106 which is connected to the tank by an air delivery pipe 107. When arranged in this way the pump cylinder also operates as a buffer for the carriage at one end of its stroke. When made double-acting the air pump operates as a buffer at each end of the stroke of the carriage, and thereby makes the machine work more smoothly and without jerk.

The canes are cut down by harvesting mechanism at the front end of the machine, and are grasped by men who stand on platforms on the machine. The canes fall over rearwardly, and the men drop their upper end portions onto the upper parts of the guide bars 38 so that their tops are cut off by the rotary blades or cutters 17 and 18. The canes are then slid down the guide bars by the endless conveyer, and are pushed one by one into the grasp of the toothed dogs on the carriage. The canes are then slid rearwardly with the carriage to enter each cane between the stripping blades and into the grip of the grooved rollers behind the stripping blades. Each cane automatically causes the stripping blades to engage with it as it passes through the axial space between them, and the cane is dragged to the rear and is discharged by the grooved rollers after being stripped of all leaves and trash.

The form of the cam plate 93 may be varied from that shown. It is shaped so as to operate the dogs at the exact points in the travel of the carriage which are found to give the best results in clamping and releasing the canes.

What I claim is:

1. In a stripping machine, a housing, spring-pressed blocks arranged in pairs and slidable in the housing, one pair being arranged to slide crosswise of the other, stripping blades pivoted to the said blocks, and means which normally hold the blades of each pair of blocks tilted at an angle to each other to present a converging entrance for the canes.

2. In a stripping machine, a housing provided with guides arranged radially in vertical and horizontal planes, spring-pressed blocks slidable in the guides, stripping blades pivoted to the blocks and arranged in tubular form, and means which normally hold the blades of each pair of blocks tilted at an angle to each other to present a converging entrance for the canes.

3. In a stripping machine, a stripping device, cutting mechanism for topping the canes arranged to one side of and above the level of the stripping device, an inclined track which supports the topped canes, a carriage for receiving the topped canes from the said track, and means for reciprocating the said carriage so that the canes are fed by it into the stripping device.

4. A stripping machine as set forth in claim 3, the said carriage being provided with means for gripping and releasing the canes at the ends of its forward and rearward strokes respectively.

5. A stripping machine as set forth in claim 3, and having also a feeding device arranged above the said guide track which delivers the canes one by one onto the carriage at the ends of its forward strokes.

6. A stripping machine as set forth in claim 3, the said inclined track comprising a pair of parallel bars which are depressible under the canes, and supporting springs arranged under the said bars.

7. A stripping machine as set forth in claim 3, the said inclined track being supported on springs which permit it to be depressed by the canes.

8. In a stripping machine, a stripping device, an inclined track for receiving the canes, a traveling carriage which transports the canes from the track to the stripping device, and a feeding device arranged above the said guide track and operating to deliver the canes one by one onto the said carriage.

9. A stripping machine as set forth in claim 8, the said feeding device comprising an endless conveyer provided with means for engaging with the canes.

10. A stripping machine as set forth in claim 8, the said feeding device comprising a pair of endless conveyer chains each provided with lugs similarly spaced apart to engage the canes one by one.

11. A stripping machine as set forth in claim 8, and having also means for sliding the said carriage back and forth, and means for operating the said feeding device step by step timed to correspond with the forward movements of the said carriage.

12. A stripping machine as set forth in claim 8, and having also means for sliding the said carriage back and forth, lever mechanism operated by the said carriage and provided with a pawl, and a ratchet toothed driving wheel engaged by the said pawl and operating the said feeding device at each forward movement of the carriage.

13. A stripping machine as set forth in claim 8, the said feeding device being provided with a pusher bar for positioning the canes on the said carriage, and means for reciprocating the pusher bar intermittently.

14. A stripping machine as set forth in claim 8, the said feeding device being provided with a slidable pusher bar for positioning the canes on the said carriage, a spring which normally retracts the pusher bar, and trip mechanism which projects the pusher bar at intervals.

15. A stripping machine as set forth in claim 8, the said feeding device comprising an endless conveyer provided with lugs which are spaced apart to engage the canes one by one, and the said machine being also provided with a pivoted lever operated by the said lugs, a spring which moves the said lever in one direction, and a pusher bar actuated by the said lever to position the canes when the lever is moved in the reverse direction.

16. A stripping machine as set forth in claim 8, and having also means for sliding the said carriage back and forth, clamping devices for holding the canes on the carriage, means for operating the clamping devices to clamp and release the canes as the carriage is slid back and forth, and means for operating the said feeding device at each forward movement of the carriage to feed the canes one by one to the said clamping devices.

17. In a stripping machine, a stripping device, a carriage slidable back and forth, clamping devices for holding the canes on the carriage and delivering them to the stripping device, and means for operating the clamping devices automatically to clamp and release the canes as the carriage is slid back and forth.

18. A stripping machine as set forth in claim 17, said clamping devices comprising a pair of dogs arranged horizontally in the said carriage and movable crosswise of it.

19. A stripping machine as set forth in claim 17, said clamping devices and said means for operating them comprising a pair of dogs supported by the carriage, spring arms pivoted to a stationary support and engaging with the said dogs, and a cam plate which slides back and forth with the carriage and operates the said spring arms.

20. A stripping machine as set forth in claim 17, said clamping devices and the means for operating them comprising a pair of dogs supported by the carriage and provided with longitudinal slots, arms pivoted between their ends to a stationary support and engaging at one end with the said slots, and a cam plate which slides back and forth with the carriage between the other ends of the said arms.

21. A stripping machine as set forth in claim 17, the said clamping devices being opposed dogs provided with springs which enable them to clamp canes of different diameter between them.

22. In a stripping machine, a supporting frame, a stripping device, a carriage slidable back and forth in the said frame, a crank and connecting-rod for sliding the carriage, arms pivoted between their ends to the said frame, opposed dogs for clamping the canes to the carriage and delivering them to the stripping device, said dogs being operated by the said arms, and a cam plate on the said connecting-rod for operating the said arms to clamp and release the canes.

23. In a stripping machine, an inclined track for supporting the canes, inclined arms secured to a stationary support and arranged above the said track and provided with shaft bearings, shafts journaled in the said bearings and provided with wheels, endless conveyer chains working over the said wheels and provided with lugs for sliding the canes down the track, a crossbar secured between the said arms and extending between the two stretches of one conveyer chain and provided with back rests above the lower stretches of both chains.

24. In a stripping machine, an inclined track for supporting the canes, inclined arms secured to a stationary support and arranged above the said track and provided with shaft bearings, shafts journaled in the said bearings and provided with wheels, endless conveyer chains working over the said wheels and provided with lugs for sliding the canes down the track, a crossbar secured between the two arms, a lever pivoted between its ends to the said crossbar and having one end portion engaged by the lugs on one chain, a pusher bar operatively connected with the other end portions of the said lever and supported by the said crossbar and operating to push the canes off the lower end of the said track, and a spring for retracting the pusher bar.

25. In a stripping machine, a frame, a carriage for the canes slidable in the frame, an inclined track for the canes arranged crosswise of the carriage and adapted to discharge the canes onto it, an endless conveyer arranged above the track and provided with a ratchet-toothed driving wheel and lugs which slide the canes down the track, a vertical shaft mounted to rock in bearings on the said frame, an arm secured on one end of the said shaft and operated by the said carriage, an arm secured to the top of the said shaft, and a pawl pivoted to the last said arm and operating the said ratchet-tooth wheel at each forward movement of the carriage.

26. In a stripping machine, a stripping device, means for passing the canes through the stripping device, a blast pipe for air, and a tubular guide nozzle for the air secured to one end of the blast pipe and operating to direct a sharp jet of compressed air against the leaves as they are stripped from the canes.

27. In a stripping machine, a stripping device, means for passing the canes through the stripping device, and an air pump operatively connected with the said means and provided with a blast nozzle arranged to blow away the leaves as they are stripped from the canes.

28. In a stripping machine, a stripping device, a slidable carriage for delivering the canes to the stripping device, a stationary air pump cylinder a piston working in the said cylinder and operated by the slidable carriage, and a blast nozzle connected with the said cylinder and arranged to blow away the leaves as they are stripped from the canes, said cylinder operating also as an air buffer for the slidable carriage.

In testimony whereof I have affixed my signature.

HENRY O. SCRANTON.